United States Patent [19]

Pirrallo

[11] Patent Number: 5,306,059
[45] Date of Patent: Apr. 26, 1994

[54] BOWLING BALL HANDLING APPARATUS

[76] Inventor: Frank G. Pirrallo, 9143 Brandy Ct., Spring Valley, Ohio 45370

[21] Appl. No.: 34,897

[22] Filed: Mar. 19, 1993

[51] Int. Cl.$^5$ .............................................. B66C 1/02
[52] U.S. Cl. .............................. 473/56; 273/DIG. 25; 294/64.1; 473/60
[58] Field of Search .............. 294/16, 64.1; 273/54 R, 273/54 B, 64, 63 F, DIG. 25; 251/321–323

[56] References Cited

U.S. PATENT DOCUMENTS

| | | | |
|---|---|---|---|
| 2,147,907 | 2/1939 | MacChesney | 273/64 |
| 2,303,393 | 12/1942 | Schmidt | 294/64.1 |
| 2,474,950 | 7/1949 | MaChesney | 294/64.1 X |
| 2,996,299 | 8/1961 | Showers | 273/64 |
| 3,206,202 | 9/1965 | Evans | 273/54 B X |
| 4,887,820 | 12/1989 | Amici et al. | 273/DIG. 25 X |

Primary Examiner—Dean J. Kramer
Attorney, Agent, or Firm—Barbara Joan Haushalter

[57] ABSTRACT

A bowling ball handling apparatus comprises a handle for a bowler to grip. A vacuum mechanism is attached to a first end of the handle for providing a vacuum to hold the bowling ball. A release mechanism is associated with a second end of the handle for releasing the vacuum when it is desired to release the bowling ball.

12 Claims, 2 Drawing Sheets

5,306,059

BOWLING BALL HANDLING APPARATUS

BACKGROUND OF THE INVENTION

The present invention relates to bowling and, more particularly, to an apparatus for allowing persons with limited dexterity to manipulate a bowling ball.

Bowling is a very popular sport, enjoyed by persons of all ages and abilities. Unfortunately, the joint flexibility required to grip and control a bowling ball prevents certain persons from participating in this sport. For example, wheelchair users who must lean sideways from a sitting position, and persons suffering from arthritis and cumulative trauma disorders such as carpal tunnel syndrome, cannot properly grip and control the ball, either due to their seated position or due to the nerve damage in their hands.

For wheelchair users, it is known in the art to provide ramps which are attachable to the chair for rolling the ball down. Unfortunately, such ramps are bulky, and do not allow the bowler much control over the speed or direction of the ball. Additionally, such ramps do not address the difficulty of gripping the ball, that wheelchair users and others often encounter.

Several attempts were made to solve the problem of allowing a person of limited dexterity to comfortably grip and control the bowling ball. One proposed system included a suction cup attached to a handle. The suction cup gripped the ball while the bowler held the handle. The bowler was required to use one finger of his gripping hand to plug a hole in the suction cup, and when the bowler was ready to release the ball, he removed his finger from the cup to break the vacuum. However, using one's finger to create the vacuum requires a certain amount of joint flexibility, which an arthritis or cumulative trauma sufferer tends not to have. Also, it is difficult to create a vacuum sufficient to lift the bowling ball by merely plugging the suction cup hole with a finger, since fingers vary so greatly in size and thickness.

A similar mechanism was proposed in an attempt to solve the problem of allowing comfortable gripping and control of a bowling ball, which eliminated the need to create a vacuum using one's finger. However, in this apparatus, the handle included interior valves, lever mechanisms, and machined holes which cooperated to create the vacuum. The vacuum and, thus, the ball, was then released when the interior valves were shifted, by using the thumb to depress a switch downward. Unfortunately, this apparatus is very complex and, therefore, expensive. Furthermore, with this design, the fingers are used to support the weight of the ball, while the thumb is only used to depress the switch upon release of the ball. Consequently, the thumb is prevented from providing any weight support for the ball, and the hand cannot comfortably curl around the handle, because the thumb must be suspended in air until the switch is ready to be depressed.

It is seen then that there exists a need for an improved means for allowing persons with limited hand dexterity to use a bowling ball which overcomes the problems associated with existing means, particularly a means which is ergonomically feasible, and is inexpensive to manufacture and produce.

SUMMARY OF THE INVENTION

This need is met by the bowling ball handling apparatus according to the present invention, wherein a handle is attached to a suction cup which grips the bowling ball. The present invention allows the user's hand, including his thumb, to curl naturally around the handle. Since the fingers of many arthritis and cumulative trauma sufferers curl even in their extended position, the present invention is an ergonomically feasible design. With the bowling ball handling apparatus of the present invention a bowler is not required to arrange his fingers in a variety of separated holes in order to lift and control release of the ball. Instead, the bowler can lift the ball by pressing the suction cup against the ball to dispel air, and control the release of the ball using a release mechanism associated with the handle to release the vacuum.

In accordance with one aspect of the present invention, a bowling ball handling apparatus comprises a handle means which the bowler grips, a vacuum mechanism attached to the handle means for providing a vacuum to hold the bowling ball, and a release mechanism associated with the handle means for releasing the vacuum when it is desired to release the bowling ball.

Accordingly, it is an object of the present invention to provide a compact bowling ball handling apparatus for use by a person having limited dexterity, allowing arthritis and cumulative trauma sufferers to enjoy the sport of bowling. It is an advantage of the present invention that the bowling ball handling apparatus is of an ergonomically efficient design. It is a further advantage of the present invention that it is inexpensive to manufacture and produce.

Other objects and advantages of the invention will be apparent from the following description, the accompanying drawings and the appended claims.

DETAILED DESCRIPTION OF THE PREFERRED EMBODIMENTS

Figure 1:
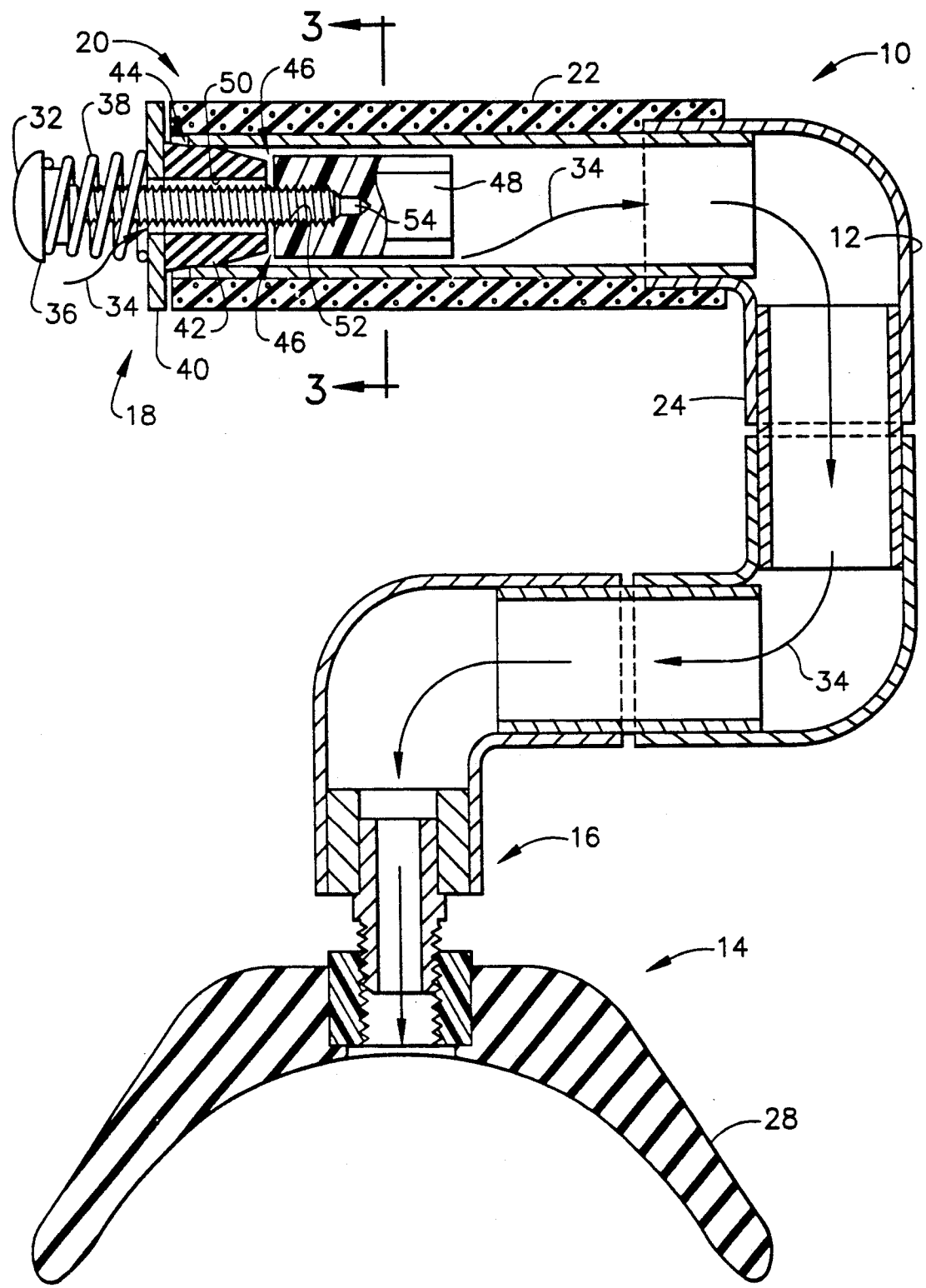
FIG. 1 is a cutaway side view illustrating the bowling ball handling apparatus according to the present invention.

Referring to the drawings, the bowling ball handling apparatus of the present invention is illustrated in FIG. 1, and generally referred to as reference number 10. The bowling ball handling apparatus 10 is comprised of a handle means 12, a vacuum mechanism 14 attached to a first end 16 of the handle means 12, and a release mechanism 18 associated with a second end 20 of the handle means 12.

Continuing with FIG. 1, the handle means 12 includes a grip portion 22, such as foam, to allow the user to comfortably grip the bowling ball handling mechanism 10. The handle means 12 further includes an extension portion 24 extending from the grip portion 22 to the vacuum mechanism 14. The extension portion 24 may be integral, or be comprised of two or more sections formed together to eliminate any air leaks in the handle means 12. The extension portion 24 may be constructed of a variety of suitable materials, including metal, plastic, and wood.

Figures 2, 3:
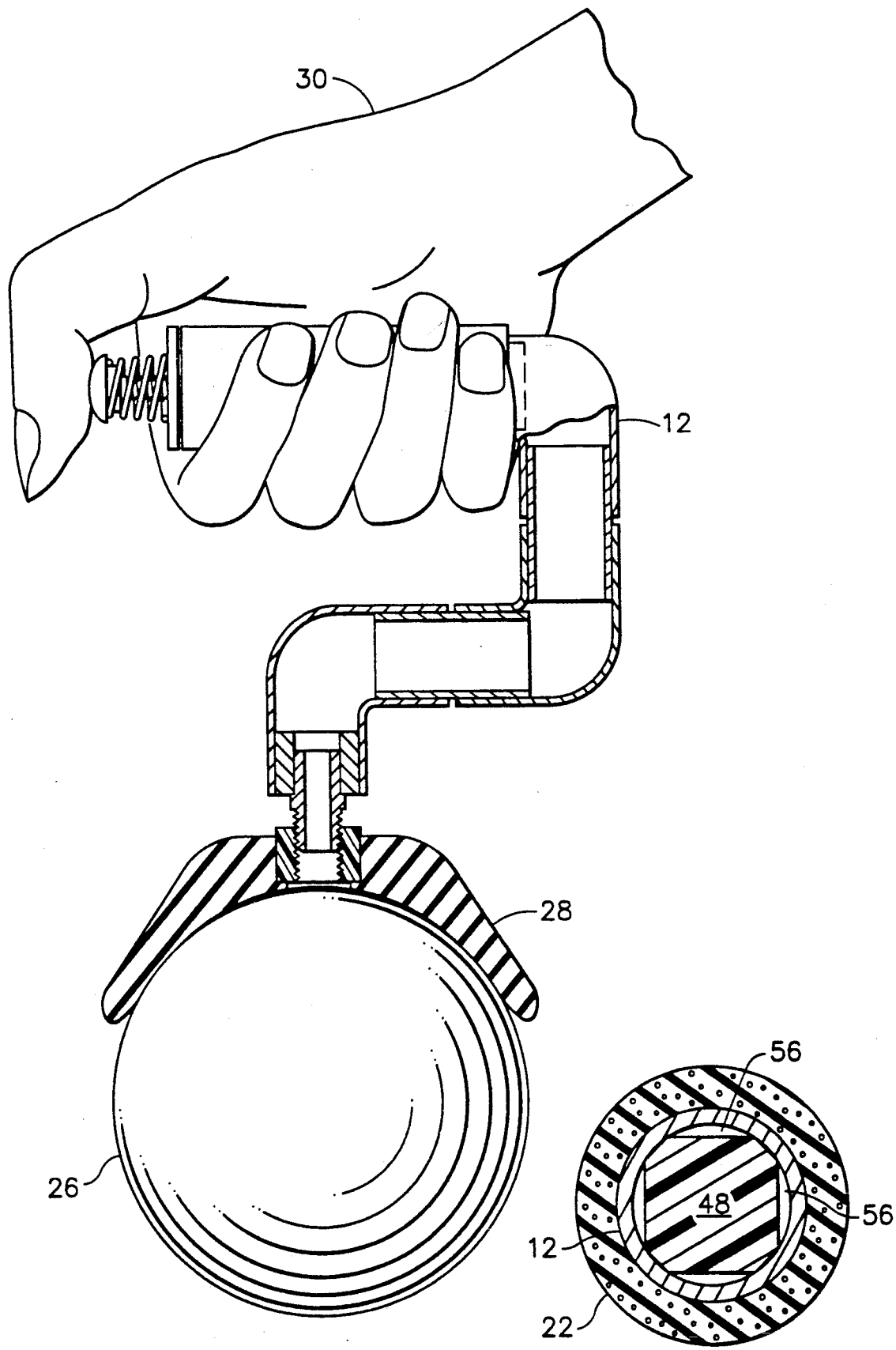
FIG. 2 shows the bowling ball handling apparatus of FIG. 1, holding a bowling ball, wherein the user's thumb is positioned to release the vacuum when it is desired to release the ball.
FIG. 3 is a section view taken along line 3—3 of FIG. 1.

As best illustrated in FIG. 2, for ease of handling the contour of the handle means 12 is such that the users hand is situated directly above the center of gravity supporting the weight of bowling ball 26. However, it will be obvious to those skilled in the art that the contour of the handle means may be of varying shapes and dimensions without departing from the scope of the invention.

Continuing with FIGS. 1 and 2, the first end 16 of the handle means 12 may be permanently or removably attached to the vacuum mechanism 14. The vacuum mechanism 14 is comprised of a suction cup 28. When the suction cup 28 is set on the bowling ball and downward pressure is applied, such as by the users hand 30 on the grip portion 22, the suction cup 28 dispels air between the ball 26 and the cup 28. The suction cup 28 then suctions the bowling ball 26 so the ball 26 is lifted when the user lifts up on the grip portion 22 of the handle means 12. The bowler can then swing the ball 26 forward, toward the bowling alley lane, manipulating the speed and direction of the ball 26. In a preferred embodiment of the present invention, the suction cup 28 is a rubber material, to most efficiently dispel the air and suction the ball 26. Obviously, the handle means 12 has a hollow interior to permit air flow when it is desired to release the vacuum between the ball 26 and the suction cup 28.

When it is desired to release the ball 26 to roll into the bowling pins at the end of the alley, the user depresses a release pin 32 associated with the release mechanism. Depression of the pin 32 releases the vacuum suctioning the ball 26 to the cup 28, and lets the ball 26 loose. When the release pin 32 is depressed, an air path is created, allowing air into the hollow interior of the handle means 12, and between the ball 26 and the suction cup 28. The air path is along the path indicated by arrow 34.

In its normal position, a head 36 of the release pin 32 extends outward from the second end 20 of the handle means 12. A spring 38 is positioned, as illustrated in FIGS. 1 and 2, from the head 36 to a washer 40. When the user depresses the head 36 of the pin 32, the washer 40 provides the spring 38 with a flat, inflexible surface to contact. On the opposite side of the washer 40 from the spring 38, is situated a stopper 42, fitted inside the second end 20 of the handle means 12. The stopper 42 provides a first sealed surface 44 between the stopper 42 and the end 20 of the handle means 12, to prevent an air path into the handle means 12 when the release pin 32 is in its normally extended position. Additionally, the stopper 42 provides a second sealed surface 46 between the stopper 42 and a valve guide 48. In a preferred embodiment, the stopper 42 is a rubber material to provide maximum sealing at the sealing surfaces 44 and 46, and the stopper 42 is tapered inward from the washer 40 to the valve guide 48, to provide maximum sealing at the sealing surface 44. In addition, the spring 38 is adjusted with sufficient force to insure a leak-proof seal between the stopper 42 and the valve guide 48.

The stopper 42 has a through hole 50 for receiving the release pin 32. When the release pin 32 is in its normally extended position, the stopper 42 abuts the washer 40 and seals at the first seal point 44. Any air that flows into the through hole 50 between the pin 32 and the stopper 42 is blocked from entering the extension portion 24 of the handle means 12 because air cannot penetrate the second sealed surface 46 between the stopper 42 and the valve guide 48. The valve guide 48 abuts the stopper 42 and has a threaded partial through hole 52 for receiving a mating threaded end 54 of the release pin 32 and also for providing support for the release pin 32 when the release pin 32 is depressed. The threaded partial through hole 52 allows for the adjustment on the spring 38 to insure the leak-proof seal between the stopper 42 and the valve guide 48.

When the release pin head 36 is depressed, the spring 38 compresses, and the end 54 of the pin 32 forces the valve guide 48 away from contact with the stopper 42, thereby opening the sealed surface 46. This allows the air path along the direction of arrow 34 to enter the handle means 12 and cause the ball 26 to release from the suction cup 28.

Referring now to FIG. 3, a section view along line 3—3 of FIG. 1 is illustrated, to show how the air flows between the valve guide 48 and the handle means 12. In a preferred embodiment, the valve guide 48 is substantially square, while the interior of the handle means 12 is substantially circular. Thus, when the valve guide is pushed away from contact with the stopper, air enters that previously sealed region, flowing between the stopper and the valve guide, and then changes direction to flow between the valve guide 48 exterior and the handle means 12 interior, in regions 56 of FIG. 3.

In a preferred embodiment of the present invention, the release mechanism 18, including the release pin 32, the spring 38, the washer 40, the stopper 42, and the valve guide 48, is a removable cartridge. This allows for cleaning of the release mechanism and replacement of parts, if needed.

The present invention provides for a bowling ball handling apparatus which allows persons of limited dexterity to lift and control a bowling ball. The user grips a handle means and pushes a suction cup onto a bowling ball. The suction cup dispels the air between the ball and the cup, so the cup will hold the ball. The user then swings his or her arm, to control the speed and direction of the ball. When it is desired to release the ball toward the bowling pins, the user depresses a release pin of a release mechanism. This creates an air flow along the stem of the pin, through the center of the stopper, around the valve guide, through the handle means, and to the suction cup, releasing the vacuum between the ball and the cup. With the bowling ball handling apparatus of the present invention, persons of limited dexterity can still enjoy the sport of bowling.

Having described the invention in detail and by reference to the preferred embodiment thereof, it will be apparent that other modifications and variations are possible without departing from the scope of the invention defined in the appended claims.

What is claimed is:

1. A bowling ball handling apparatus comprising:
   a. a handle means for a bowler to grip, the handle means having a grip portion for a user to grip and an extension portion extending from the grip portion;
   b. a rubber suction cup attached to the extension portion of the handle means for providing a vacuum to hold the bowling ball, by dispelling air and suctioning the bowling ball; and
   c. a release mechanism associated with the grip portion of the handle means for releasing the vacuum when it is desired to release the bowling ball, the release mechanism including,
      a spring;

a release pin associated with the spring to allow an air path through the handle means when the release pin is depressed;

a stopper for providing a seal when the release pin is in its normally extended position and having a through hole for receiving the release pin; and a valve guide abutting the stopper and having a partial through hole for receiving the release pin, for providing support for the release pin when the release pin is depressed.

2. A bowling ball handling apparatus as claimed in claim 1 wherein the partial through hole of the valve guide is threaded to receive the release pin, the release pin also being threaded.

3. A bowling ball handling apparatus as claimed in claim 1 wherein the release mechanism further comprises a washer situated between the spring and the stopper.

4. A bowling ball handling apparatus as claimed in claim 1 wherein the release mechanism comprises a first sealed surface between the stopper and the handle means and a second sealed surface between the stopper and the valve guide.

5. A bowling ball handling apparatus as claimed in claim 1 wherein the stopper is comprised of a rubber material.

6. A bowling ball handling apparatus as claimed in claim 1 wherein the stopper is tapered inward from the washer to the valve guide.

7. A bowling ball handling apparatus as claimed in claim 1 wherein the release mechanism comprises a removable cartridge.

8. A bowling ball handling apparatus comprising:
a. a handle means for a bowler to grip, the handle means including a grip portion for a user to grip and an extension portion extending from the grip portion;
b. a rubber suction cup attached to the extension portion of the handle means for providing a vacuum to hold the bowling ball; and
c. a release mechanism associated with the grip portion of the handle means for releasing the vacuum when it is desired to release the bowling ball, the release mechanism including,
a release pin for allowing an air path through the handle means when the release pin is depressed,
a seal means for sealing the air path through the handle means when the release pin is in its normally extended position, the seal means having a stopper fitted in the grip portion of the handle means and having a through hole for receiving the release pin and a valve guide abutting the stopper and having a threaded partial through hole for receiving a mating threaded end of the release pin, for affecting sealing of the air path through the handle means, and a spring associated with the release pin, the spring being adjusted with sufficient force to allow the seal means to seal the air path through the handle means when the release pin is in its normally extended position.

9. A bowling ball handling apparatus as claimed in claim 8 wherein the seal means further comprises a washer situated between a head of the release pin and the stopper.

10. A bowling ball handling apparatus as claimed in claim 9 wherein the stopper is tapered inward from the washer to the valve guide.

11. A bowling ball handling apparatus as claimed in claim 8 wherein the seal means further comprises a first sealed surface between the stopper and the handle means and a second sealed surface between the stopper and the valve guide.

12. A bowling ball handling apparatus as claimed in claim 8 wherein the stopper is comprised of a rubber material.

* * * * *